(12) United States Patent
Wymbs

(10) Patent No.: US 7,252,490 B2
(45) Date of Patent: Aug. 7, 2007

(54) MOVEMENT OUTPUT APPARATUS

(75) Inventor: Brendan Wymbs, Macclesfield (GB)

(73) Assignee: Wymbs Engineering Ltd., Cheshire (GB)

( * ) Notice: Subject to any disclaimer, the term of this patent is extended or adjusted under 35 U.S.C. 154(b) by 947 days.

(21) Appl. No.: 10/635,259

(22) Filed: Aug. 6, 2003

(65) Prior Publication Data

US 2005/0028620 A1 Feb. 10, 2005

(51) Int. Cl.
*F16H 21/36* (2006.01)
(52) U.S. Cl. .............................. 425/92; 74/25
(58) Field of Classification Search .................. 425/92; 74/25
See application file for complete search history.

(56) References Cited

U.S. PATENT DOCUMENTS

| | | |
|---|---|---|
| 1,771,117 A | 7/1930 | Greer |
| 3,185,129 A | 5/1965 | Sollich |
| 3,348,503 A | 10/1967 | Beik et al. |
| 3,516,267 A * | 6/1970 | Uhlir ............................ 74/25 |
| 3,824,950 A | 7/1974 | Woody |
| 4,510,823 A | 4/1985 | Leech |
| 4,913,645 A | 4/1990 | Daouse et al. |
| 5,338,170 A * | 8/1994 | Hashimoto et al. ........... 425/92 |

FOREIGN PATENT DOCUMENTS

| | | |
|---|---|---|
| DE | 486 889 | 11/1929 |
| EP | 0 465752 A1 | 1/1992 |
| WO | WO 97/16625 | 5/1997 |
| WO | WO 00/63588 | 10/2000 |

* cited by examiner

*Primary Examiner*—Robert B. Davis
(74) *Attorney, Agent, or Firm*—Thompson Coburn LLP

(57) ABSTRACT

The present invention provides a movement output apparatus for controllably moving a movement output means in at least two spatial dimensions, the apparatus including:
  a cog means with a first diameter;
  a ring with a track formed on an inner surface of the ring, the track having a second diameter which is larger than the first diameter;
wherein:
  the cog means is rotatable by first driving means;
  the ring is rotatable by second driving means;
  the cog means is arranged to move, in use, along the track; and
  the movement output means is attached to the cog means, whereby, in use, movement of the cog means effects movement of the movement output means, and the movement of the movement output means is controllable by control of the first and second driving means to produce substantially linear movement of the movement output means to produce substantially linear movement of the movement output means.

23 Claims, 7 Drawing Sheets

MOVEMENT OUTPUT APPARATUS

FIELD OF THE INVENTION

The present invention relates to a movement output apparatus. More particularly, the invention relates to a movement output apparatus for controllably moving a movement output means in a desired shape.

BACKGROUND AND SUMMARY OF THE INVENTION

It is often desirable to move items or parts of machinery to particular positions, those positions being reached with spatial reliability. In particular, it is sometimes desirable to be able reliably to cycle parts of machinery between particular positions. This would be the case, for example, where it is necessary to form a particular shape in a repetitive manner.

An example of shape forming using machinery is in the food manufacturing and processing industry. Food items such as biscuits often have decorative toppings in particular shapes. For efficiency, throughput and consistency reasons, mechanical deposition systems are often used to deposit such decorative toppings.

Such mechanical deposition systems may include a moveable deposition manifold arranged on a conveyor belt. The deposition manifold is moveable in the sense that it can be made to describe a particular shape with respect to food items travelling along the conveyor belt. Typically, the deposition manifold is moveable independently of the conveyor belt. The movement of the manifold is powered and controlled by suitable arrangements of linear drives, for example suitable arrangements of ball screws and pulleys.

More generally, it is often desirable to perform a repetitive process on a series of similar items. Typically, items are transported around a production facility using a conveyor belt or similar means. If the items are relatively small, or if the production line has a large output, the items may be arranged in ranked rows on the conveyor belt.

Many processes in production lines require that the position of the items to be processed is known with some spatial reliability. Typically, items on a conveyor belt are prone to move a little on the conveyor, due to vibrations etc. Movement apparatus can be used to move the items to a predetermined position on the conveyor, ready for a subsequent processing step. The movement apparatus typically is powered and controlled by suitable arrangements of linear drives, as for the deposition manifold above.

These arrangements of linear drives are usually bulky and difficult to install or retro-fit to existing production lines. In addition, it is difficult to operate movement of the manifold using such arrangements at speeds necessary for large volume production.

In order to address the problems outlined above, the present invention provides, in a first aspect, a movement output apparatus for controllably moving a movement output means in at least two spatial dimensions, the apparatus including:
 a cog means with a first diameter;
 a ring with a track formed on or near the surface of the ring, the track having a second diameter which is larger than the first diameter;
 wherein:
 the cog means is rotatable by first driving means;
 the ring is rotatable by second driving means;
 the cog means is arranged to move, in use, along the track; and
 the movement output means is attached to the cog means whereby, in use, movement of the cog means effects movement of the movement output means, and the movement of the movement output means is controllable by control of the first and second driving means preferably to produce a substantially linear movement of the movement output means.

Using the apparatus, the movement of the movement output means can be controlled to describe a particular two dimensional shape by suitable control of the first and second driving means.

Preferably, the ring defines a rotation plane and the cog means is preferably rotatable by the first driving means, about a first axis which is typically substantially perpendicular to the rotation plane.

Preferably, the ring is rotatable by the second driving means about a second axis which is typically substantially perpendicular to the rotation plane.

Preferably the cog means is rotatable relative to the track about a third axis which is typically substantially perpendicular to the rotation plane. This rotation of the cog means about the third axis is typically brought about due to an interaction between the cog means and the track.

Preferably, the third axis is substantially parallel to, but typically substantially not co-linear with, the second axis.

Typically, the cog means and the track each have teeth which are meshable together. Preferably, at least one of the cog means and the track have a substantially circular configuration. More preferably, both the cog means and the track each have a substantially circular configuration.

In some embodiments, the ring may be replaced by a partial ring. Using such a configuration, the track would preferably be a non-continuous arcuate track.

In preferred embodiments of the invention, the relationship between the first and second diameters is such that rotation of the cog may cause (possibly in conjunction with rotation of the ring) a point on the cog (usually a point on the perimeter of the cog) to describe a substantially straight line. Preferably, the first diameter is approximately one half of the second diameter. Using such a cog arrangement, the movement output means may be positioned with respect to the cog means such that the movement output means may describe substantially any shape in two dimensions within a particular size range.

Preferably the movement of the movement output means is controllable to produce linear movement along wither or both of two mutually perpendicular axes. More preferably in use the two axes are respectively substantially horizontal and substantially vertical.

The movement output means (which may be e.g. a cam follower) may be attached to the cog means such that the centre of the movement output means is a distance from the axis of rotation of the cog means which is substantially equal to the first diameter. In one embodiment, the movement output means is substantially cylindrical and its central axis is substantially parallel to the axis of rotation of the cog means and its central axis is a distance from the axis of rotation of the cog means which is substantially equal to the first diameter.

Preferably, the cog means is rotatably mounted on a first shaft. Preferably, the first shaft is eccentrically mounted with respect to an output rotation axis of the first drive means. Typically, therefore, operation of the first drive means rotates the first shaft eccentrically. Consequently, the cog is forced to rotatably travel around the track.

Preferably, the ring and track together form an internal gear.

Preferably, the output movement means is connected to a movement transmission means.

Preferably, the apparatus further includes control means for control of the second driving means, the control means operating according to a predetermined set of instructions. Typically, the control means includes a suitably programmed computer. Preferably, the control means controls the first driving means.

Preferably, the cog means and/or ring are replaceable by a cog means and/or ring of different dimensions in order for the movement output means to controllably describe a shape in two dimensions in a different size range.

In preferred embodiments, the apparatus further includes a controllable counterbalancing assembly. Typically, such an assembly includes an arrangement of masses which are moveable via one or more driving means. Preferably, the arrangement of masses is moveable in order to substantially reduce vibrations in the apparatus caused by movement of other parts of the apparatus. Preferably, the arrangement movement is controlled by the control means. The arrangement movement may be adapted to be a mirror image movement of the movement of those parts of the apparatus which cause, in use, undesirable vibrations.

In a second aspect, the present invention provides a repetitive processing apparatus including a movement output apparatus according to the first aspect, and further including a repetitive processing device for repeated performance of a particular process, wherein the repetitive processing device is connected to the movement output means, and in use the position of the repetitive processing device is controllable by control of the position of the movement output means.

Preferably, the apparatus further includes moveable conveyor means, whereby articles on which a particular process is to be performed are moveable with respect to the apparatus.

In a third aspect, the present invention provides a deposition apparatus including any apparatus according to the first or the second aspect.

In a fourth aspect, the present invention provides a foodstuff processing apparatus including any of the features of the second aspect and typically including any features of the third aspect, wherein the repetitive processing device is a foodstuff deposition manifold, the manifold being, in use, controllable to deposit foodstuff in a pre-programmed shape.

Preferably, the food stuff deposition manifold is capable of performing at least approximately 40 cycles per minute. More preferably, it is capable of performing up to around 100 cycles per minute or more, most preferably up to around 400 cycles per minute or more.

Preferred embodiments of the invention will now be described, by way of example only, with respect to the accompanying drawings, in which:

DETAILED DESCRIPTION OF THE PREFERRED EMBODIMENT

Figure 1:
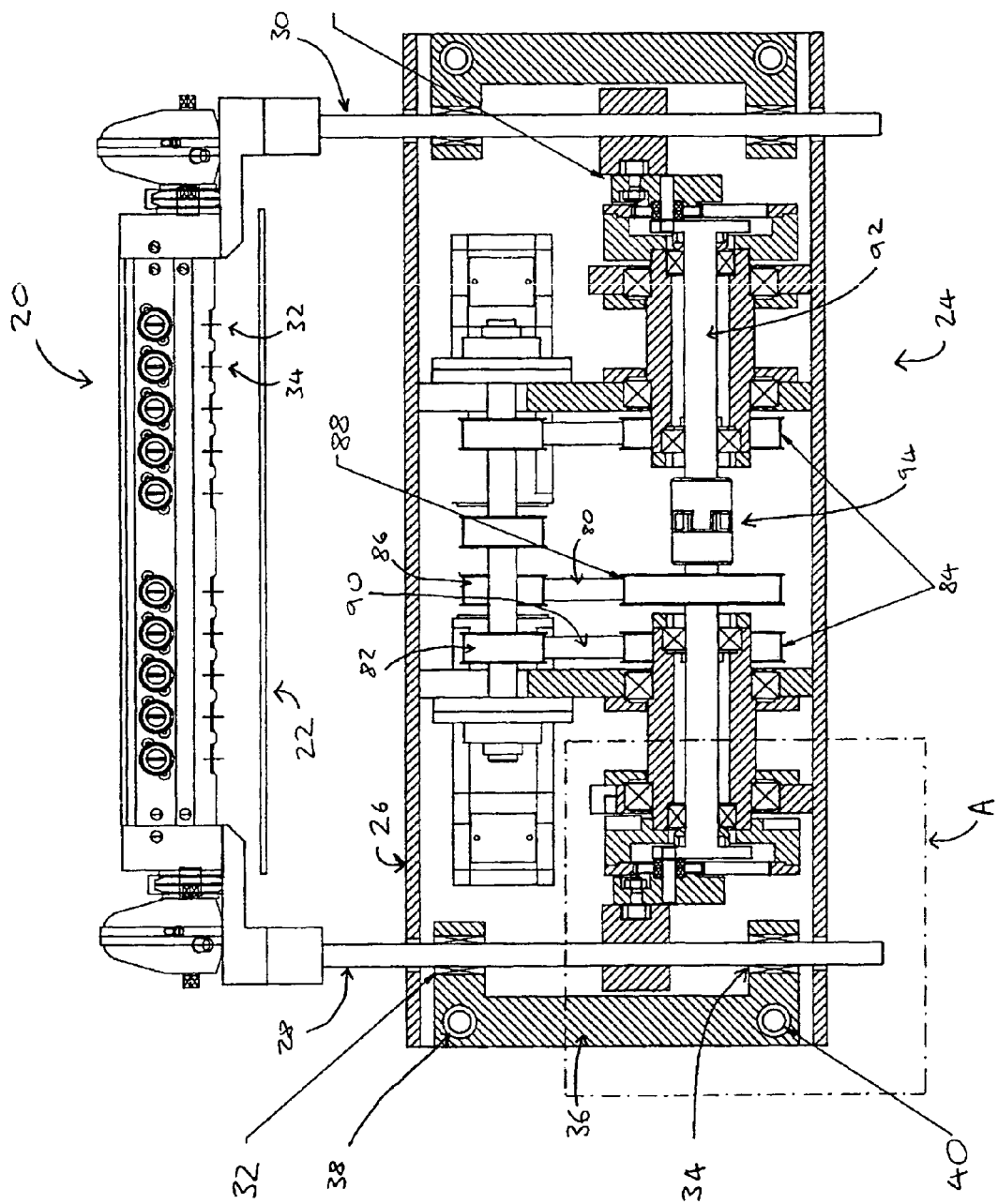
FIG. 1 shows a schematic cross-section of a food processing assembly including an embodiment of the present invention.

In FIG. 1, the position of a deposition manifold 20 with respect to a conveyor belt 22 is controlled by a control apparatus 24.

The control apparatus 24 has a housing 26. Movement rods 28, 30 connect the control apparatus 24 to the deposition manifold 20. The deposition manifold 20 may also be referred to as the depositing manifold 20.

In a typical use, the conveyor belt carries a number of food items, for example individual biscuits, past the deposition manifold. The purpose of the deposition manifold in this example is to deposit a food topping (for example cream, chocolate or jam) onto each biscuit. The deposition manifold may be a pressurized or volumetric manifold, as appropriate.

Typically, the biscuits are arranged on the conveyor belt 22 in ranked rows. Each biscuit in a particular row reaches the manifold at the same time. On the underside of the manifold there is an array of deposition nozzles (e.g. nozzles 32, 34), one nozzle per biscuit in a row.

Careful control of the height of a nozzle over a biscuit is required in order to deposit the correct shape of food topping. In addition, the shape of the food topping on the biscuit is dependent upon the horizontal position of the nozzle during deposition. Furthermore, the horizontal position of the nozzle may be required to (at least on average) keep pace with the conveyor belt during deposition.

Careful control of both the height and the horizontal position of the manifold can lead to greater uniformity in the shape of the topping on each biscuit. In addition, it can lead to less wastage of topping and biscuits. Typically, the faster the deposition process, the greater the throughput of biscuits.

After one deposition cycle (i.e. after the manifold has deposited food topping onto one row of biscuits) the manifold is moved back to start the deposition process on the next row of biscuits.

The position of the manifold 20 is controlled by the control apparatus 24, via movement rods 28, 30. Rod 28, for example, can move vertically with respect to the housing 26 due to vertical linear bearings 32, 34. The vertical linear bearings 32, 34 are contained in bearing support 36. The rod 28 and the bearing support 36 can move horizontally with respect to the housing 26 due to horizontal linear bearings 38, 40. Thus, the rod 28 (and, by analogous means, the rod 30) is moveable both horizontally and vertically, within predetermined ranges, with respect to the housing 26.

Figure 2:
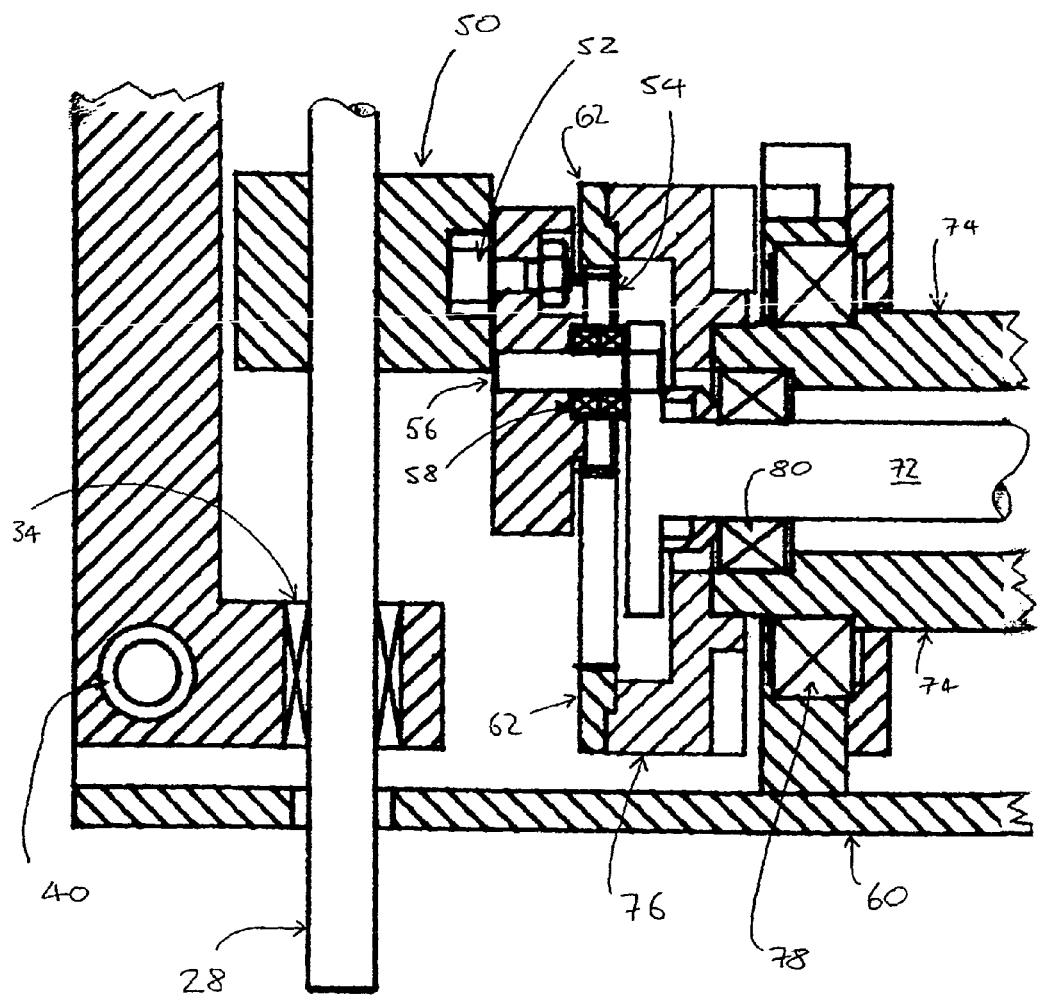
FIG. 2 shows an enlarged view of the portion marked "A" in FIG. 1.

As shown more clearly in FIG. 2, rod 28 has a cam-receiving attachment 50. Attachment 50 is fixed with respect to rod 28. Attachment 50 receives an e.g. cylindrical cam 52. Movement of cam 52 moves rod 28.

Cam 52 is attached to a cog 54. Cog 54 is rotatably mounted on shaft 56 via bearings 58. Movement of cog 54 moves cam 52 and hence moves rod 28. Cog 54 has a plane of rotation which is perpendicular to its principle axis. Cog 54 is constrained to move, in use, substantially only in this plane. Therefore, cam 52 remains substantially in one plane. Rod 28 has horizontal and vertical linear bearings and so may move in two orthogonal directions, i.e. rod 28 is also constrained to move substantially in one plane with respect to housing 26, 60 of the apparatus.

Cog 54 is arranged to fit inside a circular track which is formed on the inner surface of a ring 62. Together, the circular track and the ring 62 are an internal gear. Cog 54 has teeth, as is conventional. The track has similarly dimensioned teeth. The sets of teeth are intermeshable so that movement of the cog 54 with respect to the track leads to rotation of cog 54 with respect to the track. The cog arrangement is described in more detail below.

Figure 3:
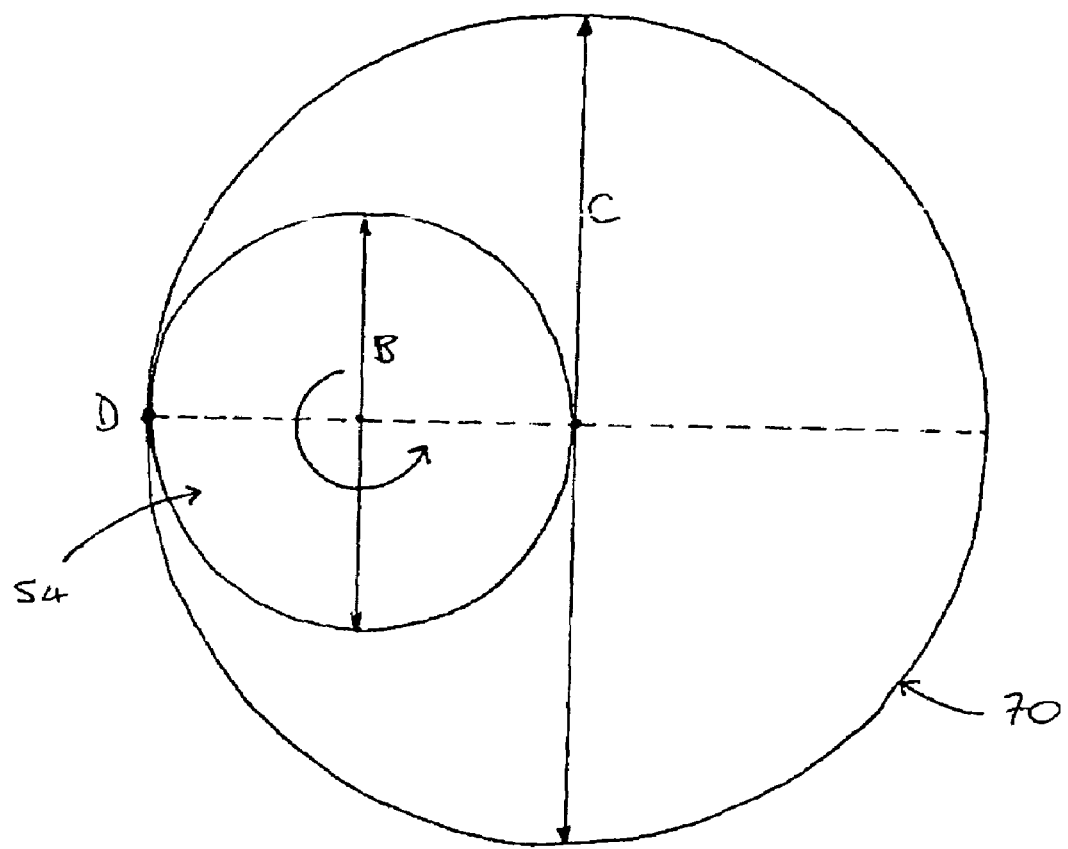
FIG. 3 shows a schematic view of the cog arrangement along the principal axis of shaft 72 in FIG. 1.

FIG. 3 shows, schematically, the cog arrangement of a preferred embodiment of the invention. For clarity, the teeth of the cog 54 are not shown. Cog 54 is arranged so that it can travel around the track 70. Again, for clarity, the outer dimensions of the ring 62 are not shown and the teeth of the track 70 are not shown.

Due to the intermeshing of the respective teeth of cog 54 and track 70, 54 rotates about pinion shaft 56. Therefore cog 54 rotates with respect to track 70. As explained in more detail further below, cog 54 is constrained to move in a circular path around the track 70 so that, in use, at least one tooth of cog 54 is in contact with a tooth of track 70.

In this preferred embodiment, cog 54 has a diameter B which is half the inner diameter C of the track 70. It will be clear that a given point on the surface of cog 54, e.g. point D, has a locus which is a straight line (shown in FIG. 3 as a dashed line) passing through the centre of the circular track 70. In other words, when cog 54 rotates around track 70, point D describes a path within the ring 62 which is a straight line passing (at least approximately) through the centre point of ring 62.

Cog 54 is forced to roll around the track 70 by movement of pinion shaft 56. Shaft 56 is eccentrically mounted with respect to drive shaft 72. Rotation of shaft 72 forces shaft 56 to describe a circular path. In this way, cog 54 is forced to rotate with respect to track 70.

The centre of cam 52 is typically located level with the circumference of cog 54, e.g. level with point D. Therefore, the cam describes a similar path to point D. As described above, this motion is transferred to rod 28. According to the above description, rotation of drive shaft 72 would lead to one-dimensional motion of rod 28, along a direction parallel to the movement of point D.

Turning back to FIG. 3, the path of point D in space can be altered by moving the track 70. The path of point D is fixed with respect to the track 70. However, if the track itself is rotated, then the path of point D moves with the track. Clearly, with any suitable combination of movement of track 70 and cog 54, point D can be placed at any spatial point within the circle defined by track 70. Similarly, with any suitable combination of movement of the track and cog, point D can be made to trace out any desired path or shape within the circle defined by track 70.

Figure 6:
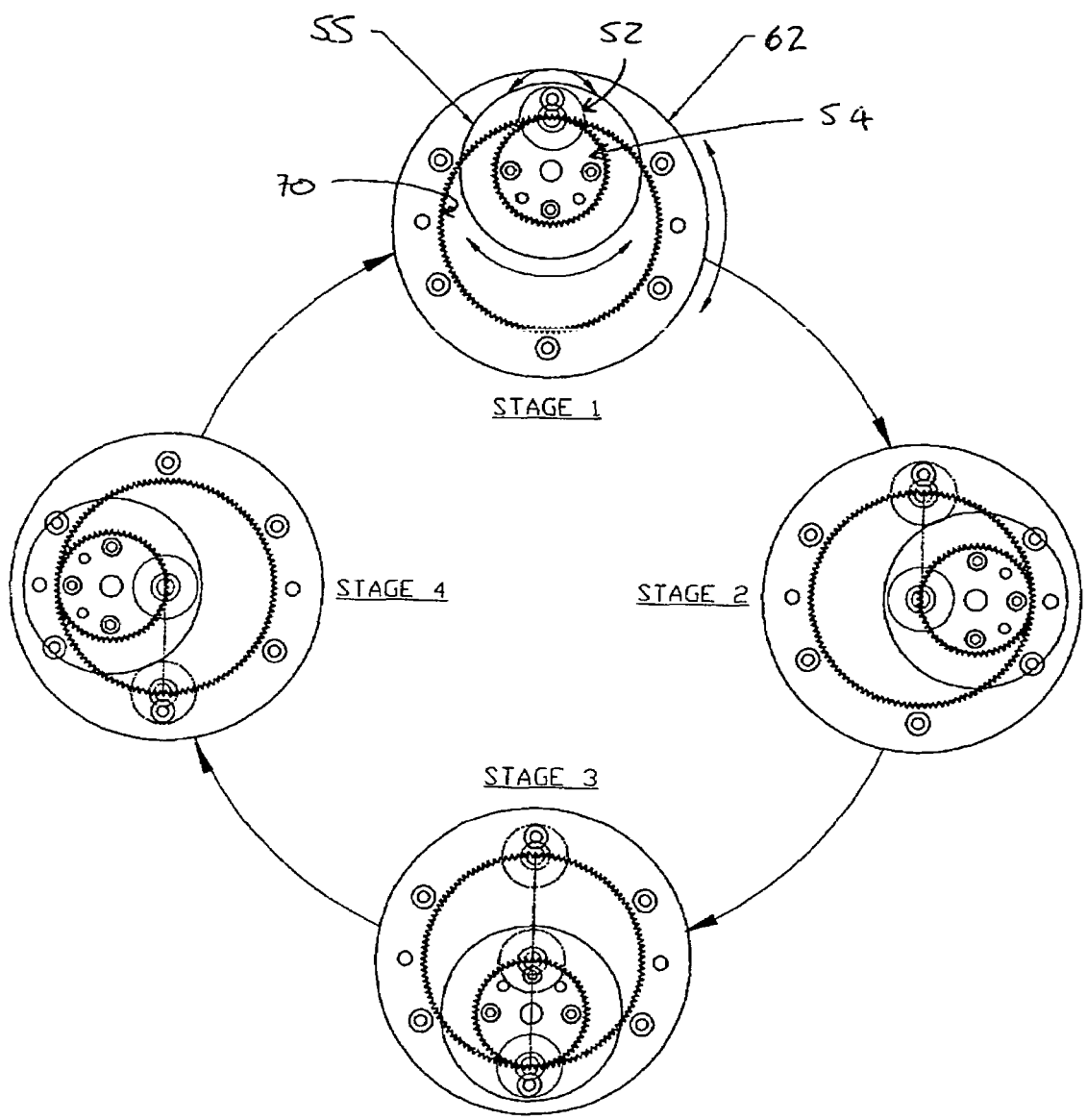
FIG. 6 shows four schematic views of the cog arrangement along the principal axis of shaft 72 in FIG. 1, each view showing the cog in a different position relative to the ring.

Looking now at FIG. 6, the movement of the cog 54 around the track 70 (internal gear) is shown in four stages. The cog 54 is mounted on movement transmission block 55. The cam 52 is mounted on the transmission block 55. The centre of cam 52 is level with a point on the perimeter of cog 54, but the cam 52 is axially displaced from the cog 54 so as not to interfere with the movement of cog 54 around the track 70.

Movement of the cog 54 around track 70, shown in FIG. 6 in four stages, makes cam 52 move in a straight line parallel to a diameter line of the track 70. Clearly, rotation of the ring 62 can give rise to deflection of the path of the cam 52.

Figure 7:
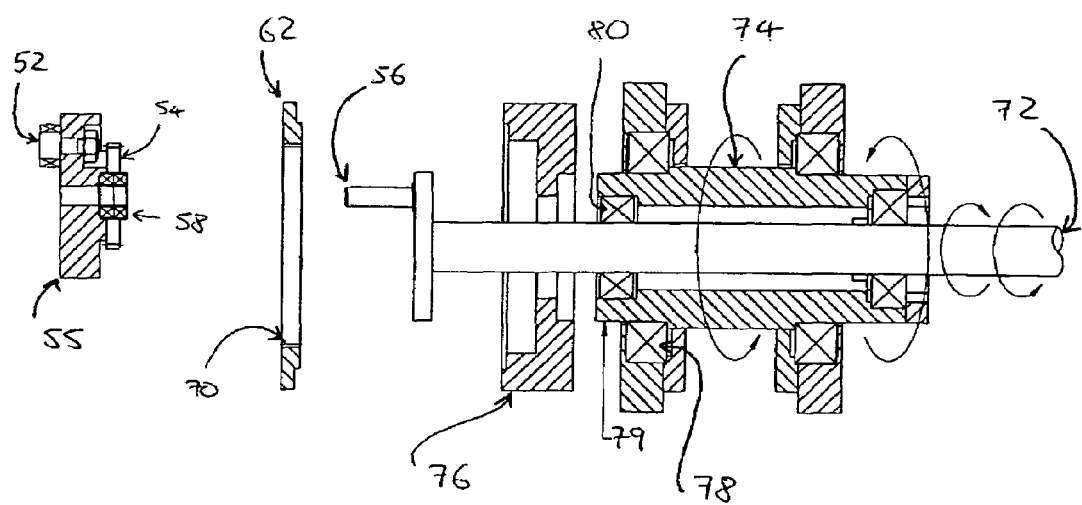
FIG. 7 shows an exploded schematic view of the drive shafts, cog, ring and cam follower of FIG. 1.

The arrangement of the cog and internal gear and associated drive shafts and bearings is shown more clearly in the exploded schematic view in FIG. 7.

In this preferred embodiment, track 70 is attached to hollow drive shaft 74 via mounting block attachment means 76. Drive shaft 74 is rotatably mounted with respect to the housing 60 via bearings 78. Bearings 78 are retained by bearing sleeve 79. Similarly, drive shaft 72 is rotatably mounted with respect to drive shaft 74 via bearings 80.

By suitable rotation of drive shaft 74, the ring 62 (and hence track 70) may be rotated about the principle axis which is common to the drive shaft 74 and the ring 62 and the drive shaft 72. The ring 62 and the cog 54 rotate in the same plane of rotation, perpendicular to this principle axis.

Since rotation of both the cog 54 and the track 70 allow for the movement of point D to be controlled, suitable control of drive shafts 72 and 74 allows control of the position of cam 52 in two dimensions. This movement is transferred to rod 28 which is able to move in two dimensions due to bearings 32, 34, 38, 40. Therefore, control of the movement of manifold 20 in two dimensions is possible.

The size of the shape which point D can describe is limited by the diameter C. The apparatus is typically arranged so that ring 62 and cog 54 can be changed for a different combination of ring and cog, with different dimensions.

Referring back to FIG. 1, the apparatus in this embodiment has a second rod 30 so that the position of the manifold 20 may be controlled with greater precision. The position of rod 30 is controlled by similar means to that which controls the position of rod 28.

Shaft 74 is driven via a belt 90 from pulley 82 to pulley 84. The rotation of pulley 82 is controlled by a servo motor. This arrangement makes up the vertical drive.

Shaft 72 is driven by a belt 80 from pulley 86 to pulley 88. The rotation of pulley 86 is controlled by a servo motor. This arrangement makes up the horizontal drive. Rotation of shaft 72 is transferred to corresponding shaft 92 via a releasable coupling of 94.

Figure 4:
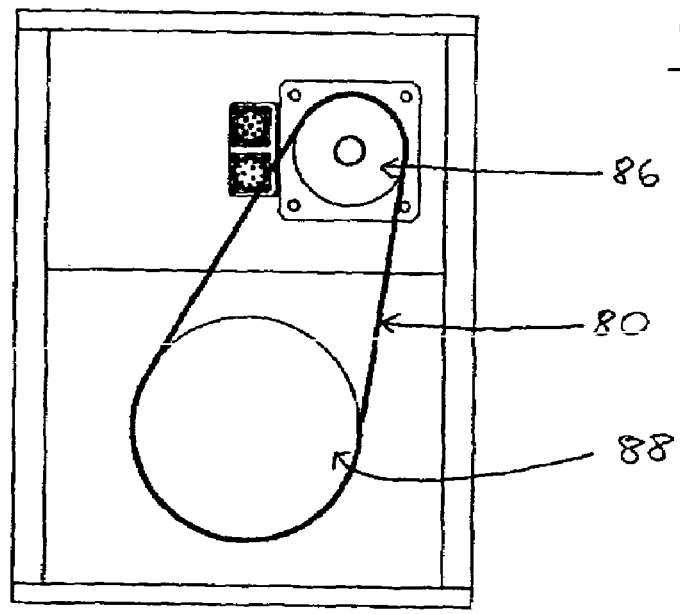
FIG. 4 shows a schematic cross-section of a horizontal drive device for the assembly of FIG. 1 in the same direction as FIG. 3.

FIG. 4 shows the horizontal drive in a view along the principle axis of shaft 72. Pulley 86 is driven by a servo motor.

Figure 5:
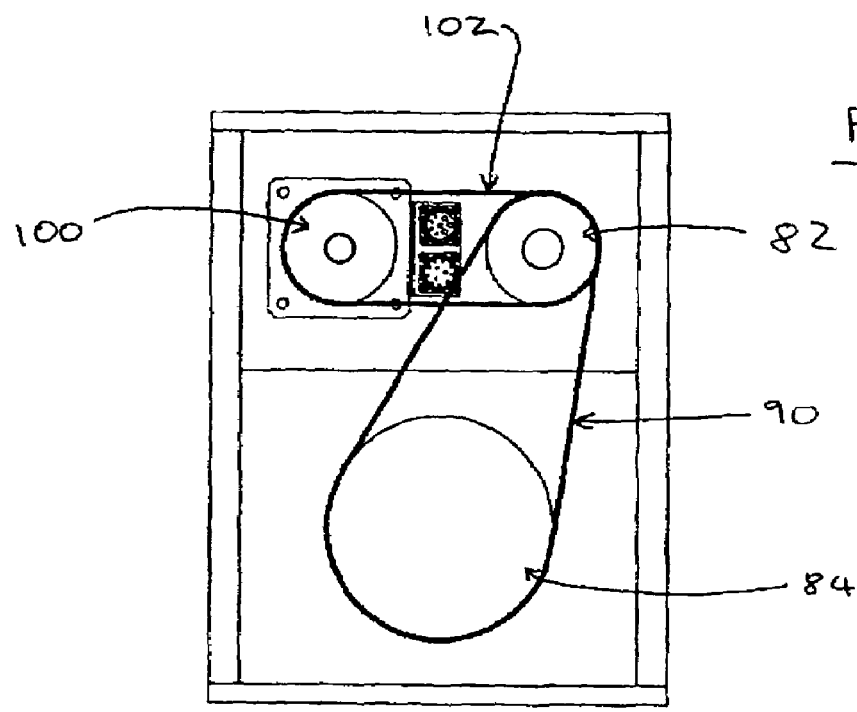
FIG. 5 shows a schematic cross-section of a vertical drive for the assembly of FIG. 1 along the same direction as FIG. 2.

FIG. 5 shows the vertical drive in view along the principle axis of shaft 74. Pulley 100 is driven by a servo motor. Pulley 100 thereby drives a belt 102 which drives pulley 82. In turn, pulley 82 drives pulley 84 via belt 90.

Typically, in use, the vertical drive may be used continuously, to give the manifold a consistent, vertical stroke. Then, a precise horizontal motion may be superimposed onto the vertical stroke to give precise control of the manifold power during the vertical stroke.

Precise control of the position of manifold 20 requires very careful control of the output of the servo motors.

The voltage input to a servo motor and the load on it determine the servo output speed. Therefore, it is possible very precisely to control the output of each servo. Co-ordinated control of the voltage input to the servo to give a determined output to form a particular shape is a complex operation. Typically, the voltage input to the servo motors is controlled by a suitably programmed computer.

The computer should have an interface by which to control the servos. In addition, the computer should have a user interface whereby a user can control the computer, e.g. by inputting a desired path for the manifold to trace out, at a particular cyclic rate and speed.

The computer typically runs using modified robotic software. Such software allows the precise co-ordinated control of electric motors, for example, in response to pre-programmed or user-defined parameters. The software utilizes inverse and forward kinematics. The software is not described further here.

In a further preferred embodiment, the apparatus typically has a controllable counterbalance weight assembly. This is used to suppress vibrations in the main apparatus induced by rapid movement of the moving parts in the assembly. Due to its eccentric path, cog 54 and associated piston shaft 56 may cause vibrations in the apparatus during use weights which are arranged in a suitable formation can move in the apparatus substantially to cancel out these vibrations. Typically the weights are arranged to move in a mirror image of the movement of the parts causing the vibration. Minimization of vibrations helps to optimize the speed at which the apparatus can perform its movements and also optimize the smoothness of the movement. Using the apparatus, cyclic movement speeds of around 100 cycles per minute are possible. Optimization of the speed can allow cyclic movement speeds of up to 400 cycles per minute or more.

Figure 8:
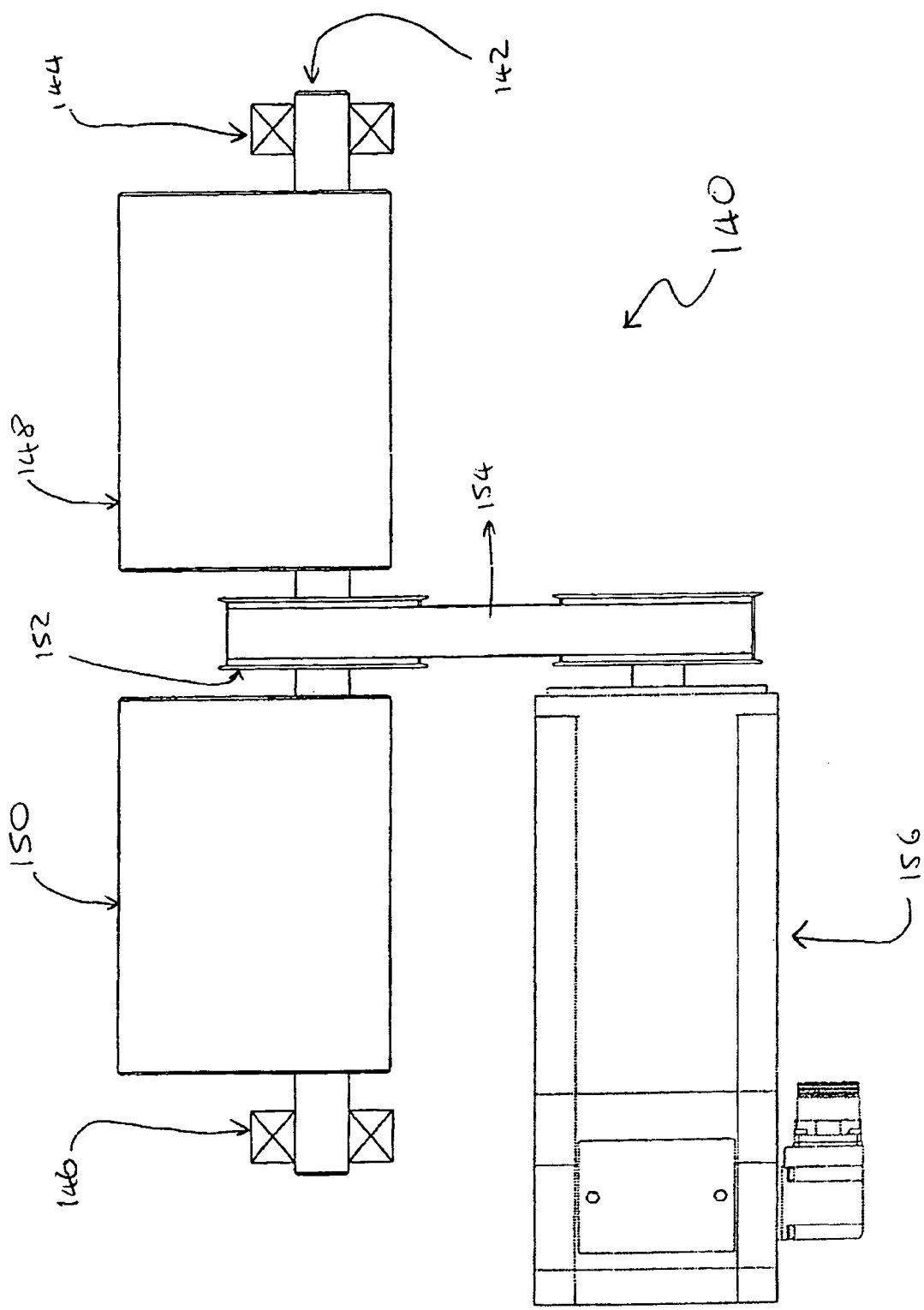
FIG. 8 shows a schematic view of a counterbalance assembly for suppression of vibration in the main apparatus.

The stretcher of a controllable counterbalance weight assembly 140 is shown schematically in FIG. 8. The assembly is mechanically attached to the main apparatus. The assembly 140 has a shaft 142 which is rotatably mounted, via bearings 144, 146, with respect to the main apparatus. The shaft 142 has weights 148, 150 mounted thereon. The weights 148, 150 are mounted eccentrically with respect to the shaft 142.

Shaft 142 is rotatable via pulley 152 and belt 154, these bring driven by servo motor 156.

The apparatus has an accelerometer (not shown) attached to its frame. This detects vibration of the frame. Typically, the frame has a vertical accelerometer and a horizontal accelerometer, for detecting horizontal and vertical components of vibration, respectively. The control computer analyses data from the accelerometer. In response to this, to reduce vibration, the computer may operate the counterbalance assembly 140. The computer controls the input voltage to the servo motor 156 in order to control the frequency of the vibrations output by the counterbalancing assembly 140. Clearly, control of the speed of the servo motor controls the frequency of the vibration output.

The size and mass of the weights 148, 150 used and the degree of the eccentricity of their mounting with respect to shaft 142 determines the types of vibrations which can be counterbalanced by the assembly 140. Alteration of these parameters can be used to adjust the assembly to counterbalance different vibrations.

The smoothness of the movement can also be controlled by suitable control of the servo motors which drive the movement. In particular, the ramping of the control voltage to the motors by the computer can be controlled to optimize smoothness.

The present invention clearly has applications in many different areas of technology. In particular, it is suitable where controlled cyclic positional movement is required. Furthermore, it is suitable for repetitive processing, for example where a similar process must be carried out on a succession of items. Typically, items in a production facility are transported from one process to the next via a conveyor belt. In large output facilities, the items may be transported on the conveyor in ranked rows. It is often necessary to "index" the items, for example if the regimentation of the items on the conveyor is distorted. The movement output apparatus described may be used to re-position the items on a conveyor belt. This could be done by an appropriate pushing movement of a pusher plate with protruding fingers. Thus, a row of ranked items could be re-positioned forwards and laterally on the conveyor belt.

Of course, the apparatus could be mounted in various different positions with respect to a conveyor belt, e.g. over, under and/or at right angles or offset angles/positions to the conveyor.

The embodiments described in detail relate to food processing but the invention has applications in other fields of technology, for example machining, where precise control of the shape described by a moving part (for example a machine tool) may be required. An example of this would be the mass machining of wooden items. Other manufacturing areas where the invention has applications are the toy manufacturing industry and other high volume, small item manufacturing or processing industries.

The invention has been described by way of example only. Modifications of the embodiments described, and further embodiments and modifications thereof will be obvious to the person skilled in the art and as such are within the scope of the invention.

What is claimed is:

1. A movement output apparatus for controllably moving a movement output means in at least two spatial dimensions, the apparatus including:
   a cog means with a first diameter;
   a ring with a track formed on an inner surface of the ring, the track having a second diameter which is larger than the first diameter;
   wherein:
   the cog means is rotatable by first driving means;
   the ring is rotatable by second driving means;
   the cog means is arranged to move, in use, along the track; and
   the movement output means is attached to the cog means, whereby, in use, movement of the cog means effects movement of the movement output means, and the movement of the movement output means is controllable by control of the first and second driving means to produce substantially linear movement of the movement output means.

2. A movement output apparatus according to claim 1 wherein:
   the ring defines a rotation plane and the cog means is rotatable by the first driving means about a first axis which is substantially perpendicular to the rotation plane;
   the ring is rotatable by the second driving means about a second axis which is substantially perpendicular to the rotation plane,
   the cog means is rotatable relative to the track about a third axis which is substantially perpendicular to the rotation plane, due to an interaction between the cog means and the track; and
   the third axis is substantially parallel to, but substantially not co-linear with, the second axis.

3. A movement output apparatus according to claim 2 wherein the cog means and the track each have teeth which are meshable together.

4. A movement output apparatus according to claim 1 wherein the cog means and the track each have teeth which are meshable together.

5. A movement output apparatus according to claim 1 wherein at least one of the cog means and the track has a substantially circular configuration.

6. A movement output apparatus according to claim 1 wherein the cog means is rotatably mounted on a first shaft.

7. A movement output apparatus according to claim 6 wherein the first shaft is eccentrically mounted with respect to an output rotation axis of the first drive means.

8. A movement output apparatus according to claim 1 wherein the first diameter is approximately one half of the second diameter.

9. A movement output apparatus according to claim 1 wherein the output movement means is connected to a movement transmission means.

10. A movement output apparatus according to claim 1 further including control means for control of the second driving means, the control means operating according to a predetermined set of instructions.

11. A movement output apparatus according to claim 10 wherein the control means includes a suitably programmed computer.

12. A movement output apparatus according to claim 10, wherein, in use, the control means controls the first driving means.

13. A movement output apparatus according to claim 10 further including a controllable counterbalancing assembly, the assembly including an arrangement of masses which are moveable via one or more driving means controlled by the control means, wherein movement of the masses is capable of effecting a reduction of vibration in the apparatus.

14. A movement output apparatus according to claim 1 wherein the cog means and/or ring are replaceable by a cog means and/or ring of different dimensions in order for the movement output means to controllably describe a shape of different dimensions.

15. A movement output apparatus according to claim 1 wherein the movement of the movement output means is controllable to produce linear movement along either or both of two mutually perpendicular axes.

16. A movement output apparatus according to claim 15 wherein in use the two axes are respectively substantially horizontal and substantially vertical.

17. A movement output apparatus according to claim 1 wherein the movement output means is attached to the cog means such that the centre of the movement output means is a distance from the axis of rotation of the cog means which is substantially equal to the first diameter.

18. A movement output apparatus according to claim 1 wherein the movement output means is substantially cylindrical and its central axis is substantially parallel to the axis of rotation of the cog means and its central axis is a distance from the axis of rotation of the cog means which is substantially equal to the first diameter.

19. A repetitive processing apparatus including a movement output apparatus according to claim 1, and further including a repetitive processing device for repeated performance of a particular process, wherein the repetitive processing device is connected to the movement output means, and in use the position of the repetitive processing device is controllable by control of the position of the movement output means.

20. A repetitive processing apparatus according to claim 19 further including moveable conveyor means, whereby articles on which a particular process is to be performed are moveable with respect to the apparatus.

21. A deposition apparatus including any apparatus according to claim 1.

22. A foodstuff processing apparatus including apparatus according to claim 19 wherein the repetitive processing device is a foodstuff deposition manifold, the manifold being, in use, controllable to deposit foodstuff in a pre-programmed shape.

23. A foodstuff processing apparatus according to claim 22 wherein the foodstuff deposition manifold is capable of performing at least 40 cycles per minute.

* * * * *